United States Patent [19]
Uchida et al.

[11] Patent Number: 6,080,240
[45] Date of Patent: Jun. 27, 2000

[54] METHOD FOR RECOVERING SUBLIMABLE MATERIAL

[75] Inventors: Hiroshi Uchida; Hideki Sogabe; Teruaki Yabuuchi, all of Himeji, Japan

[73] Assignee: Nippon Shokubai Co., Ltd., Osaka, Japan

[21] Appl. No.: 09/055,290

[22] Filed: Apr. 6, 1998

[30] Foreign Application Priority Data

Apr. 7, 1997 [JP] Japan .................................. 9-088482

[51] Int. Cl.⁷ .................................................. C30B 23/00
[52] U.S. Cl. ........................... 117/105; 117/109; 117/915
[58] Field of Search ..................... 117/105, 109, 117/915

[56] References Cited

U.S. PATENT DOCUMENTS

| | | |
|---|---|---|
| 4,252,545 | 2/1981 | Haferkorn . |
| 5,180,463 | 1/1993 | Le Moigne et al. ..................... 117/915 |
| 5,180,571 | 1/1993 | Hosoya et al. ........................... 117/915 |
| 5,264,071 | 11/1993 | Anthony et al. ........................ 117/915 |
| 5,443,654 | 8/1995 | Hiltunen et al. . |

FOREIGN PATENT DOCUMENTS

| | | |
|---|---|---|
| 1-42953 | 9/1989 | Japan . |
| 4-131101 | 5/1992 | Japan ..................................... 117/109 |

OTHER PUBLICATIONS

Patent Abstracts of Japan, vol. 097, No. 001, Jan. 31, 1997, JP 08 243 301, Sep. 24, 1996.
Patent Abstracts of Japan, vol. 016, No. 425 (C–0982), Sep. 7, 1992, JP 04 145 991, May 19, 1992.

*Primary Examiner*—Robert Kunemund
*Attorney, Agent, or Firm*—Oblon, Spivak, McClelland, Maier & Neustadt, P.C.

[57] ABSTRACT

Crystal of sublimable material is recovered by introducing a reaction gas containing sublimable material into a vertical recovery chamber kept at a temperature near a depositing temperature of the sublimable material to form a crystal deposit of the sublimable material on a surface of a wall of the chamber, and cooling the wall formed with the crystal deposit to a temperature below the previous temperature to cause a contraction difference between the crystal deposit and the wall formed with the crystal deposit, and break away the deposited crystal from the wall.

10 Claims, 1 Drawing Sheet

US 6,080,240

METHOD FOR RECOVERING SUBLIMABLE MATERIAL

BACKGROUND OF THE INVENTION

This invention relates to a method for recovering sublimable material such as pyromellitic dianhydride and terephthalic acid at an improved efficiency.

Pyromellitic dianhydride, which is one of sublimable materials, is useful as raw material for heat resistance polymers such as polyimide resin and as a curing agent for epoxy resin. Known as a method for producing pyromellitic dianhydride at a high purity has been a method disclosed in Japanese Examined Patent Publication No. Sho 47-18745. In this known method, pyromellitic dianhydride is deposited from an reaction gas containing pyromellitic dianhydride produced by the vapor phase oxidation method. Specifically, a reaction gas containing pyromellitic dianhydride is introduced into a recovery apparatus which is formed with a depository surface and kept at a temperature lower than a subliming temperature of pyromellitic dianhydride, thereby rendering pyromellitic dianhydride to deposit on the depository surface in the form of crystal. Thereafter, the deposited pyromellitic dianhydride crystal is removed from the depository surface.

Also, Japanese Examined Patent Publication No. Sho 57-27722 discloses a method in which a reaction gas containing pyromellitic dianhydride is allowed to deposit on a cooling plate formed with small holes, and the deposited pyromellitic dianhydride crystal is scraped off by a rotated comb-like or brush-like blade.

Further, Japanese Unexamined Patent Publication No. Hei 4-131101 discloses a method in which a reaction gas containing pyromellitic dianhydride is introduced into a recovery apparatus together with hard-wearing particles, and the deposited pyromellitic dianhydride crystal is removed from a depository surface through collision of particles.

Furthermore, there has been proposed a method of applying a mechanical impact to a recovery apparatus by an air knocker and the like to remove the deposited pyromellitic dianhydride crystal from a depository surface.

Pyromellitic dianhydride is a sublimable substance, and has a melting point of 286° C. and a considerably high subliming temperature. For these reason, it has been difficult to take out deposited pyromellitic dianhydride crystal from a recovery apparatus.

In the case of sublimable material having a low subliming temperature, the sublimable material crystal can be easily obtained by heating a recovery apparatus formed with deposited sublimable material crystal to sublime the deposited sublimable material. However, in the case of sublimable material having a high subliming temperature, it is hard to sublimate the deposited sublimable material. Particularly, in the case of sublimable material having a subliming temperature of 200° C. or higher, a pressure of 1500 KPaG or higher is required to sublime deposited material when using steam. This needs equipment to generate steam. Alternatively, when using an electric heater as heating source, there is the problem of consuming a considerable large energy to sublime deposited material. Further, even if melting deposited sublimable material, a considerable large energy is required. Moreover, in the case of sublimable material being an organic compound, decomposition or deterioration is likely to occur when exceeding a specified temperature, resulting in industrially fatal damage.

On the other hand, in the case of mechanical recovery as the use of scraping blade, disclosed by Japanese Examined Patent Publication No. Sho 57-27722, without heating, there are problems that the recovering construction becomes complicated and driving trouble is liable to occur, and little degree of freedom in designing a recovery apparatus.

Also, in the case of adding hard-wearing particles as disclosed by Japanese Unexamined Patent Publication Patent No. Hei 4-131101, it is necessary to separate hard-wearing particles which are added in reaction gas containing sublimable material introduced into a recovery apparatus. Accordingly, there is the problem that a special apparatus is provided to separate hard-wearing particles, disadvantageously making the size of sublimable material recovery equipment larger.

Further, in the case of applying an mechanical impact to a recovery apparatus with an air knocker, the recovery apparatus is required to have a strength enough to withstand the impact. Also, the impact is unavoidably applied to a limited portion of the recovery paratus. Consequently, deposited sublimable material cannot be uniformly removed.

SUMMARY OF THE INVENTION

It is an object of the present invention to provide a method for recovering sublimable material which has overcome the problems residing in the prior art.

According to an aspect of the present invention, a method for recovering sublimable material, comprising the steps: introducing a reaction gas containing sublimable material into a chamber kept at a first temperature near a depositing temperature of the sublimable material to form a crystal deposit of the sublimable material on a surface of a wall of the chamber; and cooling the wall formed with the crystal deposit to a second temperature below the first temperature to cause a contraction difference between the crystal deposit and the wall formed with the crystal deposit, and break away the deposited crystal from the wall.

With the inventive recovery method, crystal of sublimable material is easily recovered simply by cooling the wall formed with the crystal deposit below the temperature at which the crystal deposit is formed. Accordingly, the inventive method makes it possible to simplify the construction of sublimable material recovering apparatus.

These and other objects, features and advantages of the present invention will become more apparent upon a reading of the following detailed description and accompanying drawing.

DETAILED DESCRIPTION OF THE PREFERRED EMBODIMENT OF THE INVENTION

Figure 1:
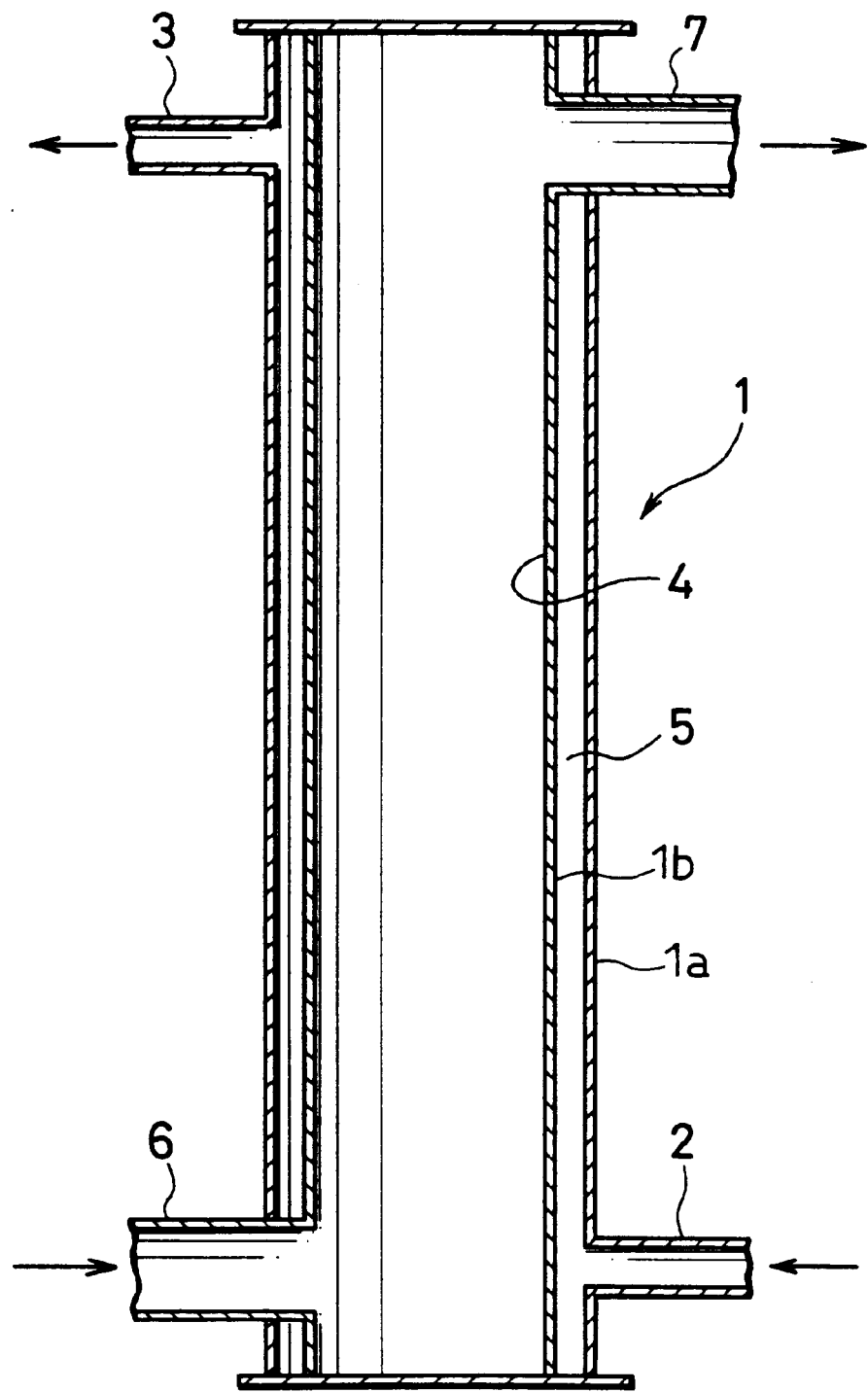
FIG. 1 is a sectional view of a recovery apparatus embodying the present invention.

The inventors of the present invention have studied recovery of sublimable material from various angles, and found out an efficient recovery that sublimable material is easily broken away and recovered from a depository surface by lowering the temperature of the depository surface below a depositing temperature after sublimable material is deposited on the depository surface to cause a difference in contraction between wall defined with the depository surface and the deposited material.

Specifically, a reaction gas containing sublimable material is introduced into a vertical recovery apparatus having a depository surface to form a crystal deposit of sublimable material on the depository surface. The temperature of the wall defined with the depository surface is lowered below a depositing temperature after the deposit is formed, thereby causing a difference in contraction between the wall defined with the depository surface and the deposit of sublimable material.

It should be noted that in this specification, the term "reaction gas containing sublimable material" means not only a reaction gas including air, sublimable material, and other gas, which is produced by the vapor phase oxidation method, but also a reaction gas including sublimable material and other gas, and only sublimable material gas. Further, there is no limitation in the mixing ratio of components of reaction gas and in the production method of reaction gas.

The inventive recovery method is especially useful for recovery of one or more selected from the group consisting of sublimable organic compounds, sublimable inorganic compounds, and sublimable inorganic simple substance, whose depositing temperature is 200° C. or higher.

Further, the following operation conditions are preferable to recover sublimable material effectively:

(a) Temperature difference between the crystal deposit of sublimable material and the wall formed with the crystal deposit is 15° C. or more;

(b) The cooling rate of the wall formed with the crystal deposit is 15° C. or more per hour;

(c) The thermal coefficient of the wall formed with the crystal deposit when being lowered is $1.0 \times 10^{-5}/°$ C. or more;

(d) The depository surface is a ground surface; and (e) Vibration or impact is applied to the crystal deposit of sublimable material.

Next, an embodiment of the present invention will be described in more details with reference to the accompanying drawing. FIG. 1 shows a construction of a recovery apparatus carrying out the present invention. In this embodiment, pyromellitic dianhydride to be recovered as sublimable material is exemplarily referred.

As shown in FIG. 1, a vertical recovery apparatus 1 including an outer hollow cylinder 1a and an inner hollow cylinder 1b. There is provided a space 5 between the outer hollow cylinder 1a and the inner hollow cylinder 1b. The outer hollow cylinder 1a has a diameter of 200 mm and a height of 4000 mm. The top and bottom of the outer and inner hollow cylinders are closed by top and bottom plates, respectively.

The outer hollow cylinder 1a is connected at a lower portion thereof with a cooling medium inflow pipe 2 for introducing a cooling medium and at an upper portion thereof with a cooling medium outflow pipe 3 for discharging the introduced cooling medium. The cooling medium is flowed in the space 5 between the outer and inner hollow cylinders.

The inner hollow cylinder 1b is provided at a portion opposite to the cooling medium inflow pipe 2 with a gas inflow pipe 6 for introducing reaction gas containing pyromellitic dianhydride and at a portion opposite to the cooling medium outflow pipe 3 with a gas outflow pipe 7 for discharging the reaction gas. The reaction gas is flowed in the inner hollow cylinder 1b. A depository surface 4 is defined on an inside surface of the wall of the inner hollow cylinder 1b.

The reaction gas containing pyromellitic dianhydride is introduced into the vertical recovery apparatus 1 through the gas inflow pipe 6, and pyromellitic dianhydride is deposited in the form of crystals on the depository surface 4 which is kept, by the cooling medium, at a temperature lower than the depositing temperature of pyromellitic dianhydride. Thereafter, the wall defined with the depository surface 4 is cooled further below the previous temperature at which the crystal deposit of pyromellitic dianhydride is formed. The further cooling of the wall defined with the depository surface 4 allows the crystal of pyromellitic dianhydride to peel off or break away from the depository surface 4 owing to the fact that the further cooling causes a difference in contraction between the wall defined with the depository surface 4 and the crystal deposit. Accordingly, pyromellitic dianhydride having a higher purity is recovered.

This recovery can be accomplished merely by controlling the temperature of the wall formed with the crystal deposit, and need not a large and complicated equipment as the conventional recovery methods. Thus, the installation and running costs can be remarkably reduced. Also, the periodic inspection can be performed more easily.

The temperature difference between the crystal deposit of sublimable material and the wall formed with the crystal deposit is preferably 15° C. or more. In the case that the temperature difference between the crystal deposit and the wall formed with the crystal deposit is less than 15° C., the contraction difference between the wall and the deposit is insufficient to cause peel-off and breaking away of the deposited crystal. For realization of such temperature difference, the cooling rate of the wall formed with the crystal deposit is preferably 15° C. or more per hour. When the wall formed with the crystal deposit is cooled at a cooling rate of 15° C. or more per hour, the temperature difference between the crystal deposit and the wall formed with the crystal deposit will assuredly be 15° C. or more due to the difference in the heat transfer rate between the crystal deposit and the wall formed with the crystal deposit, which consequently causing the crystal to peel off or break away from the depository surface 4.

In addition, from the viewpoint of large difference in contraction between the wall formed with the crystal deposit and the crystal deposit by the further cooling, the material of the wall formed with the crystal deposit is preferable to have a thermal coefficient of $1.0 \times 10^{-5}/°$ C. or more in the temperature drop. If the wall formed with the crystal deposit has a thermal coefficient less than $1.0 \times 10^{-5}/°$ C. in the temperature drop, it becomes hard to cause so large difference in contraction between the crystal deposit and the wall formed with the crystal deposit as to cause the peel-off of the deposited crystal. As an example, carbon steel and stainless steel are preferable. In the case of stainless steel, the thermal coefficient is $1.7 \times 10^{-5}/°$ C. in the temperature drop from 185° C. to 50° C.

To ensure readily peel-off of deposited crystal, furthermore, it is preferable to grind the depository surface 4 by buffing and electropolishing.

Moreover, it should be appreciated to apply vibration or impact to the crystal deposit in addition to the further cooling of the wall formed with the crystal deposit. Specifically, vibration or impact is given to the wall formed with the crystal deposit by use of a vibrator or a knocker. Alternatively, the recovery apparatus may be vibrated in entirety. Also, a jet of liquid or gas is directed to the crystal deposit to peel off. Further, a soot blower may be used. These auxiliary devices may be of electrically driven type, mechanically driven type, or pressure driven type. The use of such auxiliary device generates additional peel-off effect to the crystal deposit, thus increasing the deposit removing efficiency in combination with the further cooling.

The inventors has proposed a recovery method of applying vibration to crystal deposit with sound waves (Japanese Patent Application No. Hei 7-49963). This sound wave vibration recovery operation may be adopted in combination with the inventive recovery method utilizing contraction difference. In the case of combining the vibration or impact recovery operation with the inventive recovery method, to ensure long operation, it may be appreciated to discharge sublimable material crystal from the recovery apparatus by utilizing the kinetic energy of vibration or impact. Further, it may be appreciated to perform the recovery method utilizing contraction difference when the vibration or impact recovery operation cannot peel off sublimable material crystal perfectly, and remaining crystal grows to such a size as to block the discharge opening of the recovery apparatus and make the vibration or impact recovery operation difficult.

In the foregoing description, pyromellitic dianhydride has been exemplarily referred as sublimable material. However, the present invention is not limited to pyromellitic dianhydride, but applicable to sublimable organic compounds, sublimable inorganic compounds, and sublimable inorganic simple substances, whose depositing temperature is 200° C. or higher, such as naphthalic dianhydride, anthraquinone, terephthalic acid, fumaric acid, nicotinic acid, melamine, alanine, phloroglucinol, chloranil, chloranilic acid, vanillic acid, and hexamethylentetramine. The inventive recovery method enables efficient recovery of various kinds of sublimable material having a high depositing temperature of 200° C. or more.

Advantageous effects of the inventive recovery method will be described with reference to examples. However, it should be noted that the present invention is not limited to the following examples, and any changes and modifications may be possible unless such changes and modifications depart from the scope of the present invention.

EXAMPLES

In the construction shown in FIG. 1, reaction gas containing pyromellitic dianhydride, after being cooled to 245° C., was introduced into the vertical recovery apparatus 1 of stainless steel (SUS316) kept at 185° C. through cooling medium to allow the pyromellitic dianhydride to deposit on the depository surface 4 in the form of crystal. The depositing operation was performed for 48 hours or more. Thereafter, the wall formed with the crystal deposit was cooled to 50° C. at cooling rates shown in TABLE 1 to peel off or break away the crystal deposit of pyromellitic dianhydride from the depository surface and recover it. During the cooling, the recovery apparatus 1 was closed.

TABLE 1 shows the state of peel-off of the deposited crystal, the recovery efficiency of the crystal, the purity of pyromellitic dianhydride in the crystal, and the appearance of the crystal with reference to the cooling condition (cooling rate and cooling time). The term "the recovery efficiency" means a ratio of an amount of the recovered crystal to an amount of the deposited crystal. In Examples 3 and 4, after the elapse of two hours after the start of cooling, the temperature differences between the crystal deposit and the depository surface reached 15° C. or more.

TABLE 1

| Example | 1 | 2 | 3 | 4 |
|---|---|---|---|---|
| Cooling Rate (° C./hr) | Natural Cooling | 10 | 15 | 20 |
| Depositing Time (hr) | 48 | 48 | 72 | 48 |
| Cooling Range of Recovery apparatus (° C.) | 185 → 50 | 185 → 50 | 185 → 50 | 185 → 50 |
| Cooling Time (hr) | not less than 24 | 13.5 | 9 | 6.8 |

TABLE 1-continued

| Example | 1 | 2 | 3 | 4 |
|---|---|---|---|---|
| Peel-off State of Crystal | slightly peel-off | slightly peel-off | wholly peel-off | wholly peel-off |
| Recovery Efficiency (%) | 15 | 28 | 95 | 99 |
| Purity of Pyromellitic Dianhydride (%) | 99.8 or more | 99.8 or more | 99.8 or more | 99.8 or more |
| Appearance of Crystal | white | White | white | white |

It is understood from TABLE 1 that crystal of pyromellitic dianhydride having a high purity was efficiently recovered by cooling the wall formed with the crystal deposit at the specified rates to cause contraction difference between the crystal deposit and the wall formed with the crystal deposit.

What is claimed is:

1. A method for recovering sublimable material, comprising the steps:

introducing a reaction gas containing sublimable material into a chamber having a wall that is kept at a first temperature near a depositing temperature of the sublimable material to form a crystal deposit layer of the sublimable material on an inner surface of the wall of the chamber; and cooling the wall of the chamber formed with the crystal deposit layer on the inner surface thereof to a second temperature below the first temperature so that the temperature of the wall is lower than the temperature of the crystal deposit layer to cause a contraction difference between the crystal deposit layer and the wall, and thereby break the deposited crystal layer into pieces.

2. A method according to claim 1, wherein the wall extend in a vertical direction.

3. A method according to claim 1, wherein the sublimable material is at least one selected from the group consisting of sublimable organic compounds, sublimable inorganic compounds, and sublimable inorganic simple substances whose depositing temperature is 200° C. or higher.

4. A method according to claim 1, wherein the difference between the first temperature and the second temperature is 15° C. or more.

5. A method according to claim 1, wherein the rate of cooling the wall from the first temperature to the second temperature is 15° C. or more per hour.

6. A method according to claim 1, wherein the wall has a thermal coefficient of $1.0 \times 10^{-5}/°$ C. or more in the temperature drop.

7. A method according to claim 1, wherein the depository surface of the wall is a ground surface.

8. A method according to claim 1, wherein the crystal deposit layer is applied with vibration or impact.

9. A method according to claim 8, wherein the application of vibration or impact to the crystal deposit layer is performed before cooling the wall.

10. A method according to claim 1, wherein the difference between the temperature of the wall and the temperature of the crystal deposit is 15° C. or more.

* * * * *